(12) United States Patent
King

(10) Patent No.: US 6,308,083 B2
(45) Date of Patent: *Oct. 23, 2001

(54) INTEGRATED CELLULAR TELEPHONE WITH PROGRAMMABLE TRANSMITTER

(75) Inventor: Joseph D. King, Ann Arbor, MI (US)

(73) Assignee: Lear Automotive Dearborn, Inc., Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,147

(22) Filed: Jun. 16, 1998

(51) Int. Cl.[7] ....................................... H04B 1/40
(52) U.S. Cl. ..................... 455/556; 455/88; 455/352; 455/419; 340/825.22; 340/825.72; 341/172
(58) Field of Search ............................. 455/88, 66, 352, 455/556, 260, 419; 340/825.22, 825.69, 825.72; 341/172, 176

(56) References Cited

U.S. PATENT DOCUMENTS

| | | | |
|---|---|---|---|
| 4,392,022 | * | 7/1983 | Carlson .......................... 179/2 TV |
| 5,138,649 | * | 8/1992 | Krisbergh et al. ................. 455/344 |
| 5,201,067 | | 4/1993 | Grube et al. . |
| 5,442,340 | | 8/1995 | Dykema . |
| 5,479,155 | | 12/1995 | Zeinstra et al. . |
| 5,583,485 | | 12/1996 | Van Lente et al. . |
| 5,614,891 | | 3/1997 | Zeinstra et al. . |
| 5,680,134 | | 10/1997 | Tsui . |
| 5,686,903 | | 11/1997 | Duckworth et al. . |
| 5,699,055 | | 12/1997 | Dykema . |
| 5,717,410 | | 2/1998 | Ohmine et al. . |

FOREIGN PATENT DOCUMENTS

| | | |
|---|---|---|
| 0748105 | 12/1996 | (EP) . |
| WO 9401963 | 1/1994 | (WO) . |

* cited by examiner

*Primary Examiner*—Lee Nguyen
(74) *Attorney, Agent, or Firm*—Niro, Scavone, Haller & Niro

(57) ABSTRACT

The inventive cellular telephone includes a telephone for transmitting outgoing telephone call signals and receiving incoming telephone call signals and a transmitter for producing a wireless control signal to operate a remote device. The remote device may be a remote keyless entry system, a garage door opener, an estate gate opener, a home security system, a home lighting system, or some other system. To reduce cost, a single transmitter may produce both the control signal and the outgoing telephone call signals. In a preferred embodiment, the transmitter may be programmed to reproduce one or more unique control signals to operate several remote devices.

8 Claims, 1 Drawing Sheet

INTEGRATED CELLULAR TELEPHONE WITH PROGRAMMABLE TRANSMITTER

BACKGROUND OF THE INVENTION

This invention relates to an integrated cellular telephone with a programmable transmitter.

A programmable transmitter, sometimes referred to as a universal transmitter, is a device which may be "trained" to reproduce the control signals of one or more remotely controlled systems. All-in-one, programmable, infrared remote control transmitters for televisions, videocassette recorders, and stereos combine the functions of several remotely controlled systems into a single transmitter. Similarly, several radio frequency (RF) controlled systems, such as garage door openers, security lighting, estate gates, and alarm systems, may be operated with a single transmitter that has the ability to "learn" and reproduce the unique RF messages employed by various manufacturers. Thus, a single programmable transmitter can eliminate the need to carry several separate RF transmitters. As a result, programmable transmitters provide a convenient way to consolidate the functions of several hand-held transmitters into a single device.

Cellular telephones, sometimes referred to as personal communication systems (PCS), provide a convenient way to place and receive telephone calls. A cellular telephone is a wireless radio transmitter and receiver which communicates through any of a number of antenna towers, each serving a particular "cell" within a given region. Over the past decade, the use of cellular phones and the number of cellular antenna towers have dramatically increased. Due to recent advancements in technology, most cellular phones are of a portable, hand-held size. As a result, many people now routinely carry a cellular phone. Further, most people must carry several hand-held transmitters to operate devices such as remote keyless entry systems, garage door openers, home security systems, etc.

Accordingly, there is a desire to integrate the functions of a cellular phone and several hand-held transmitters into a single portable, hand-held device.

SUMMARY OF TIE INVENTION

In a disclosed embodiment of this invention, a cellular telephone includes a telephone for transmitting outgoing telephone call signals and receiving incoming telephone call signals and a transmitter for producing a wireless control signal to operate a remote device. Preferably, the remote device is a remote keyless vehicle entry system, a garage door opener, an estate gate opener, a home security system, or a home lighting system. To reduce cost, the transmitter may produce both the control signal and the outgoing telephone call signals.

In a preferred embodiment of this invention, the transmitter may be programmable to reproduce one or more unique control signals to operate several remote devices.

These and other features of the present invention will be best understood from the following specification and drawings, the following of which is a brief description.

DETAILED DESCRIPTION OF THE PREFERRED EMBODIMENT

Figure 1:
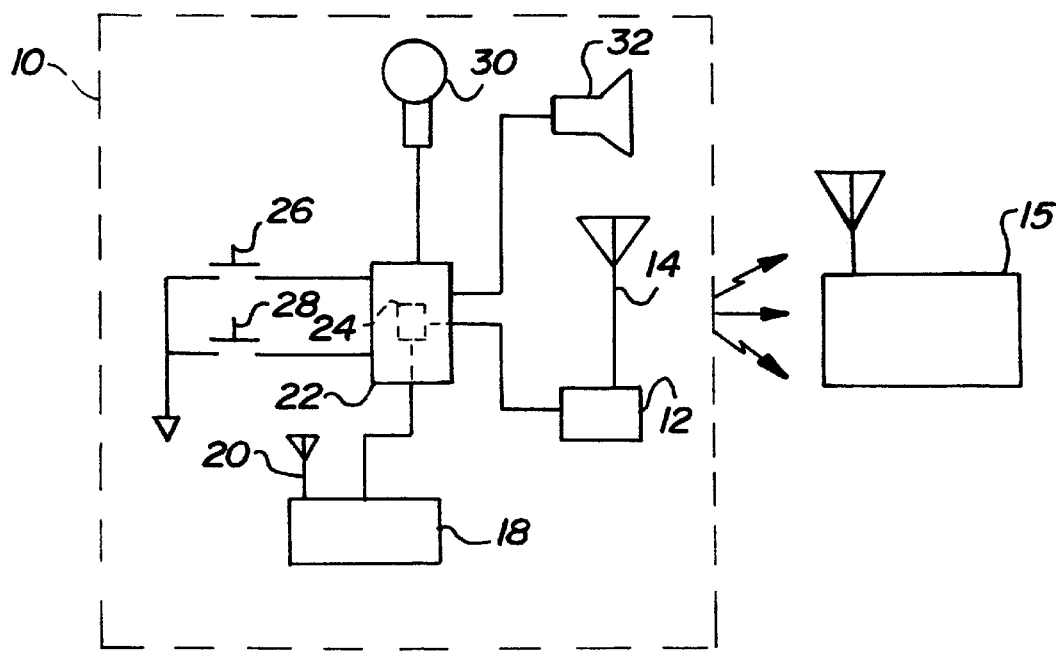
FIG. 1 is an electrical schematic diagram of a cellular telephone including a programmable transmitter feature in accordance with the present invention.

FIG. 1 is an electrical schematic diagram of a cellular telephone 10 including a programmable transmitter feature in accordance with the present invention. The cellular telephone 10 transmits outgoing telephone call signals and receives incoming telephone call signals. The cellular telephone 10 includes a transmitter 12 for producing a wireless control signal. An antenna 14 is connected to the transmitter 12 for broadcasting the wireless control signal. In a preferred embodiment of the present invention, the transmitter 12 produces both the wireless control signal and the outgoing telephone call signals. Typically, the wireless control signal and the incoming telephone call signals are airwave signals having different radio frequencies. Accordingly, in one embodiment of the present invention, the transmitter 12 consists of a wide band voltage controlled oscillator capable of producing both the wireless control signal and the outgoing telephone call signals.

Figure 2:
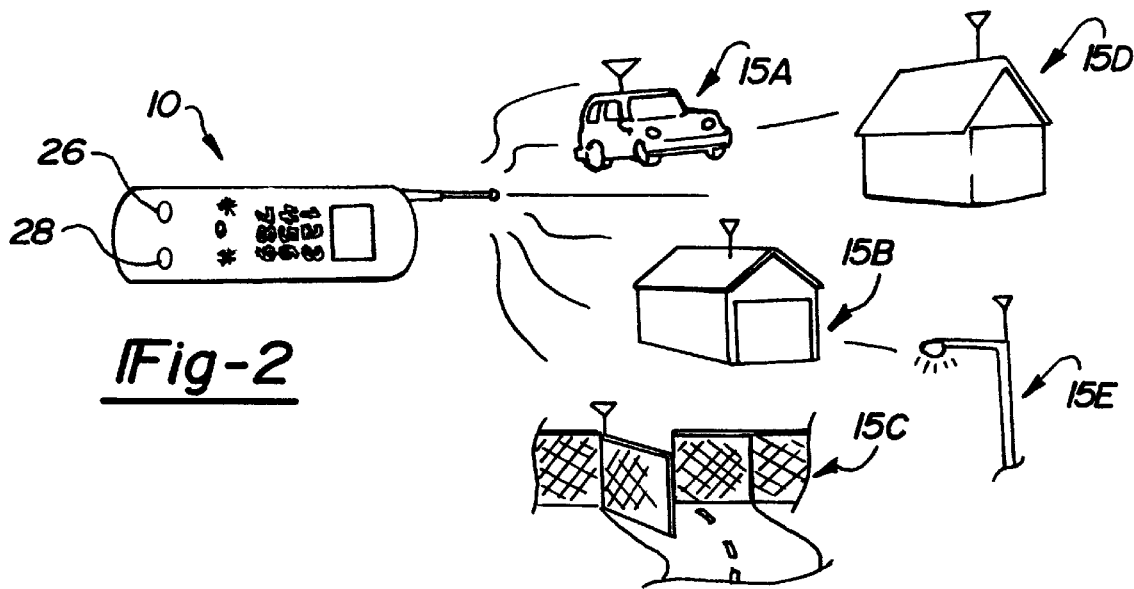
FIG. 2 shows a schematic of the types of systems which may be controlled by this invention.

As shown in FIG. 2, the wireless control signal has a unique frequency and code to operate a remote device 15 such as a remote keyless vehicle entry system 15A, a garage door opener 15B, an estate gate opener 15C, a home security system 15D, a home lighting system 15E or any other system operated with a wireless control signal.

Referring back to FIG. 1, cellular telephone 10 further includes a receiver 18 for receiving wireless control signals and the incoming telephone call signals. As explained below, telephone 10 will receive wireless control signals in a learning mode to "learn" appropriate signals to actuate one of the systems 15A–15E. The receiver 18 includes an antenna 20 for collecting local airborne signals such as the wireless control signal and the incoming telephone call signals. Typically, the wireless control signal and the incoming telephone call signals are airwave signals having different radio frequencies. Therefore, to receive both the wireless control signal and the incoming telephone call signals, a portion of the receiver 18 is preferably frequency independent. In a preferred embodiment of the present invention, a portion of the receiver 18 is a conventional diode detector.

The cellular telephone 10 also includes a controller 22 for controlling the transmitter 12 to produce the wireless control signal and the outgoing telephone call signals. Typically, the controller 22 is a microprocessor. In a preferred embodiment of the present invention, the controller 22 includes memory 24 for learning the wireless control signal. The controller may then control the transmitter 12 to reproduce the "learned" wireless control signal. In this manner, the cellular telephone may be programmed to reproduce one or more unique wireless control signals to operate several remote devices 14. As a result, the functions of the cellular telephone 10 and several hand-held transmitters are integrated into a single portable, hand-held device.

In a preferred embodiment of the present invention, the cellular telephone includes plurality of input switches 26 and 28 for producing input signals providing operational information to the controller 22.

The cellular telephone 10 also includes a conventional microphone 30 connected to the controller 22 for converting audible sound waves from a user into electrical waves and a conventional speaker 32 for converting electrical waves from the controller 22 into an audible sound waves.

Switches 26, 28 may be actuated in some manner to send a signal to actuate systems 15A–15E. As an example, switch 26 could actuate remote entry system 15A. While switch 28 actuates garage door opener 15B. A combination of switches 26 and 28 can be actuated to control the other systems 15C–15E. Preferably, the switches would be actuated in some combination to move the system into a "learning" mode at which it can receive and then store an appropriate control signal.

While preferred switches are shown, many distinct switch sequences or designs can be used to achieve the goals of this invention. Thus, as an alternative, the normal telephone keyboard can be utilized to control the actuation by pushing the keys in some predetermined sequences.

The controller 22 is disclosed somewhat schematically and a worker in the appropriate art would be able to design an appropriate control, given the basic functions disclosed in this application.

While this invention is described as relating to a cellular phone, it should be understood that it relates to any type of wireless telephone. As an example, it extends to radio-frequency telephones, or PCS systems, which incorporate telephone functions in addition to several other functions such as paging, etc.

Further, as to the trainable system for teaching the inventive telephone the signals for the systems to be actuated by its transmitters, a system such as described in U.S. Pat. application Ser. No. 09/027,323 filed Feb. 20, 1998 and entitled "Multiple Frequency Programmable Transmitter" should be referenced.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A combination transceiver comprising:

a telephone including a transmitter for transmitting outgoing telephone call signals and a receiver for receiving incoming telephone call signals, wherein said transmitter is further for transmitting outgoing wireless control signals and said receiver is further for receiving incoming wireless control signals;

a controller including a memory, wherein said controller is responsive to a first incoming control signal received by said receiver to store in said memory information identifying a first outgoing control signal, and wherein said controller is further responsive to the stored information to cause said transmitter to transmit the first outgoing control signal, and wherein the first outgoing control signal is intended to operate a remote device; and an oscillator circuit for producing the outgoing telephone call signals and the outgoing control signals by modulation, wherein said controller controls said oscillator to modulate the outgoing telephone call signals and the outgoing control signals, said controller further controlling demodulation of the incoming telephone call signals and the incoming control signals received by said receiver.

2. The transceiver of claim 1, wherein said transmitter includes a wide band voltage controlled oscillator.

3. The transceiver of claim 1, wherein the remote device consists of at least one of a remote keyless entry system, a garage door opener, an estate gate opener, a home security system and a home lighting system.

4. The transceiver of claim 1, wherein said receiver includes a frequency independent receiver.

5. The transceiver of claim 1, wherein said receiver includes a diode detector.

6. The transceiver of claim 1, wherein said controller controls said transmitter to transmit the outgoing telephone call signals.

7. The transceiver of claim 1, further comprising a plurality of input switches for producing input signals providing operational information to said controller.

8. The transceiver of claim 1, wherein said controller includes a microprocessor.

* * * * *